(12) United States Patent
Oku

(10) Patent No.: US 8,325,278 B2
(45) Date of Patent: Dec. 4, 2012

(54) VIDEO DISPLAY BASED ON VIDEO SIGNAL AND AUDIO OUTPUT BASED ON AUDIO SIGNAL, VIDEO/AUDIO DEVICE NETWORK INCLUDING VIDEO/AUDIO SIGNAL INPUT/OUTPUT DEVICE AND VIDEO/AUDIO REPRODUCTION DEVICE, AND SIGNAL REPRODUCING METHOD

(75) Inventor: Hirotaka Oku, Osaka (JP)

(73) Assignee: Panasonic Corporation, Osaka (JP)

( * ) Notice: Subject to any disclaimer, the term of this patent is extended or adjusted under 35 U.S.C. 154(b) by 633 days.

(21) Appl. No.: 12/439,835

(22) PCT Filed: Nov. 27, 2007

(86) PCT No.: PCT/JP2007/072848
§ 371 (c)(1),
(2), (4) Date: Mar. 4, 2009

(87) PCT Pub. No.: WO2008/069050
PCT Pub. Date: Jun. 12, 2008

(65) Prior Publication Data
US 2010/0188566 A1    Jul. 29, 2010

(30) Foreign Application Priority Data
Nov. 29, 2006    (JP) ................................ 2006-321482

(51) Int. Cl.
*H04N 5/46* (2006.01)
(52) U.S. Cl. ........ 348/558; 348/556; 348/441; 370/490; 370/464
(58) Field of Classification Search .......................... None
See application file for complete search history.

(56) References Cited

U.S. PATENT DOCUMENTS

| | | | |
|---|---|---|---|
| 7,129,992 B2 * | 10/2006 | Barnichon | 348/556 |
| 2003/0035065 A1 * | 2/2003 | Kim | 348/558 |
| 2003/0206242 A1 * | 11/2003 | Choi | 348/441 |
| 2004/0090556 A1 * | 5/2004 | Kamieniecki et al. | 348/558 |
| 2004/0119891 A1 * | 6/2004 | Barnichon | 348/556 |

(Continued)

FOREIGN PATENT DOCUMENTS
JP    2000-278655 A    10/2000
(Continued)

OTHER PUBLICATIONS
English language Abstract of JP 2006-319503 A.
(Continued)

*Primary Examiner* — Jefferey Harold
*Assistant Examiner* — Sam Huang
(74) *Attorney, Agent, or Firm* — Greenblum & Bernstein, P.L.C.

(57) ABSTRACT

When a format of a video signal or an audio signal received by a receiver of a video/audio signal input/output device is switched by a channel selecting operation by a user, a format determiner determines an output format. An output format communicator transmits format information indicating the output format to a video/audio reproduction device through a communicator. After a converter switches the output format, the communicator transmits the video signal and the audio signal to the video/audio reproduction device. When a communicator of the video/audio reproduction device receives the format information, a format switcher switches reproduction setting of a display based on the format information. After that, when the communicator receives the video signal and the audio signal, the display reproduces video and audio.

5 Claims, 9 Drawing Sheets

U.S. PATENT DOCUMENTS

| | | | |
|---|---|---|---|
| 2004/0150747 A1* | 8/2004 | Sita | 348/558 |
| 2004/0218094 A1* | 11/2004 | Choi | 348/441 |
| 2004/0263687 A1* | 12/2004 | Muramatsu | 348/558 |
| 2005/0068346 A1* | 3/2005 | Ogawa et al. | 345/699 |
| 2005/0128349 A1* | 6/2005 | Takamori et al. | 348/441 |
| 2006/0209880 A1* | 9/2006 | Chang et al. | 370/464 |

FOREIGN PATENT DOCUMENTS

| | | |
|---|---|---|
| JP | 2001-346109 | 12/2001 |
| JP | 2002-101348 A | 4/2002 |
| JP | 2003-333527 A | 11/2003 |
| JP | 2005-026884 A | 1/2005 |
| JP | 2005-051547 A | 2/2005 |
| JP | 2005-109703 A | 4/2005 |
| JP | 2005-167895 A | 6/2005 |
| JP | 2005-341190 A | 12/2005 |
| JP | 2006-108750 A | 4/2006 |
| JP | 2006-294120 A | 10/2006 |
| JP | 2006-319053 A | 11/2006 |
| JP | 2006-319503 A | 11/2006 |
| JP | 2007-110295 A | 4/2007 |

OTHER PUBLICATIONS

English language Abstract of JP 2005-341190 A.
English language Abstract of JP 2006-294120 A.
English language Abstract of JP 2005-051547 A.
English language Abstract of JP 2006-108750 A.
English language Abstract of JP 2000-278655 A.
English language Abstract of JP 2001-346109.
English language Abstract of JP 2002-101348 A.
English language Abstract of JP 2003-333527 A.
English language Abstract of JP 2007-110295 A.

* cited by examiner

FIG. 3

| VIDEO FORMAT | HORIZONTAL PIXELS | VERTICAL PIXELS | p/i | HORIZONTAL FREQUENCY | ASPECT RATIO |
|---|---|---|---|---|---|
| | 720 | 480 | i | 59.94/60Hz | 4:3 |
| | 720 | 480 | p | 59.94/60Hz | 4:3 |
| | 1920 | 1080 | i | 59.94/60Hz | 16:9 |

F I G. 4

| FORMAT INFORMATION | HORIZONTAL PIXELS | VERTICAL PIXELS | p/i | HORIZONTAL FREQUENCY | ASPECT RATIO |
|---|---|---|---|---|---|
| | 720 | 480 | i | 59.94/60Hz | 4 : 3 |

FIG. 7

FORMAT INFORMATION LIST

| CHANNEL | HORIZONTAL PIXELS | VERTICAL PIXELS | p/i | HORIZONTAL FREQUENCY | ASPECT RATIO | AUDIO FORMAT |
|---|---|---|---|---|---|---|
| 001 | 720 | 480 | i | 59.94/60Hz | 4:3 | Mpeg |
| 002 | 720 | 480 | p | 59.94/60Hz | 4:3 | Mpeg |
| 003 | 720 | 480 | i | 59.94/60Hz | 4:3 | Mpeg |
| 004 | 1920 | 1080 | i | 59.94/60Hz | 16:9 | AC3 |
| ... | | | | | | |
| 99 | 720 | 480 | i | 59.94/60Hz | 4:3 | Mpeg |
| 100 | 1920 | 1080 | i | 59.94/60Hz | 16:9 | Mpeg |

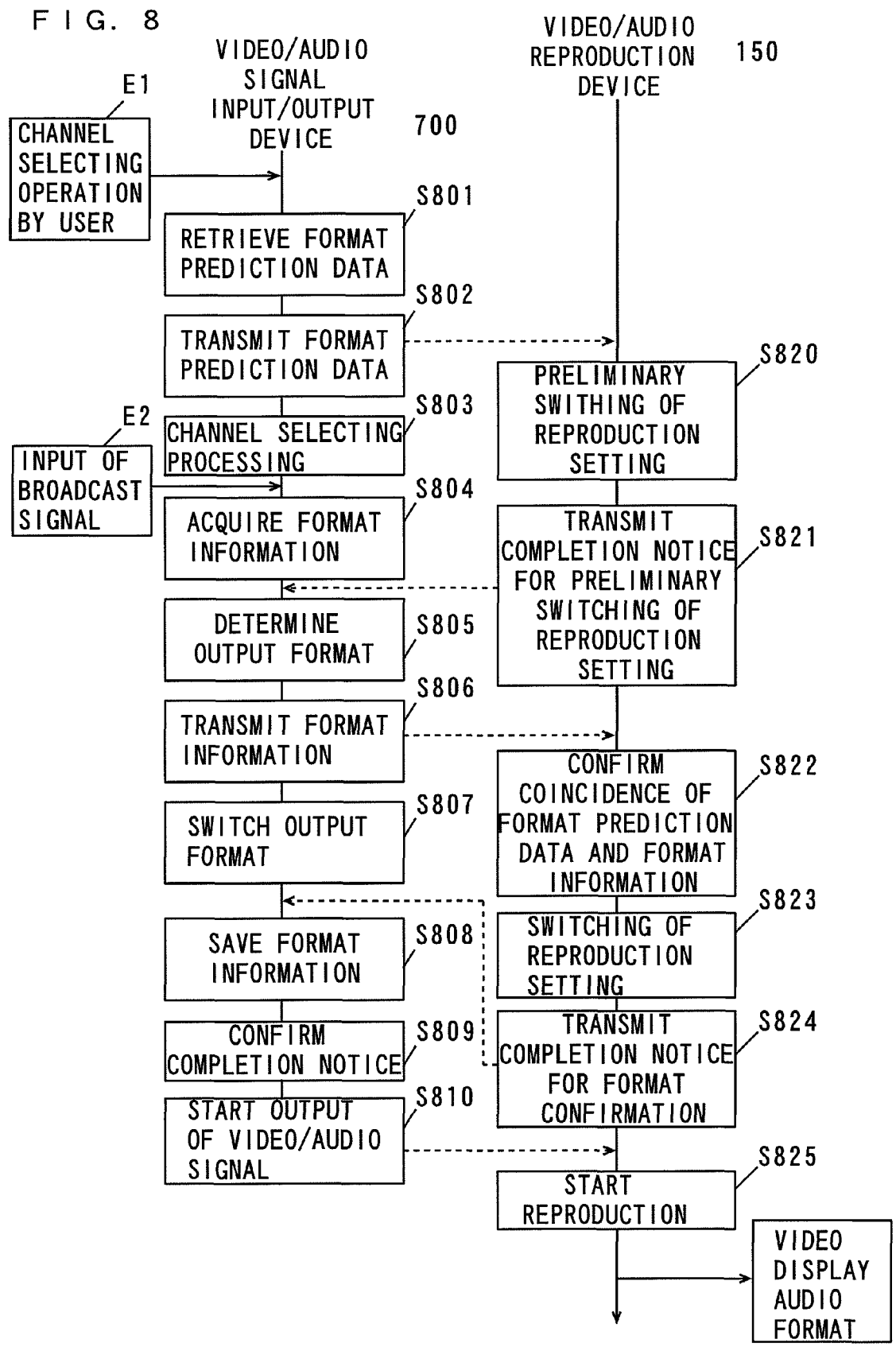

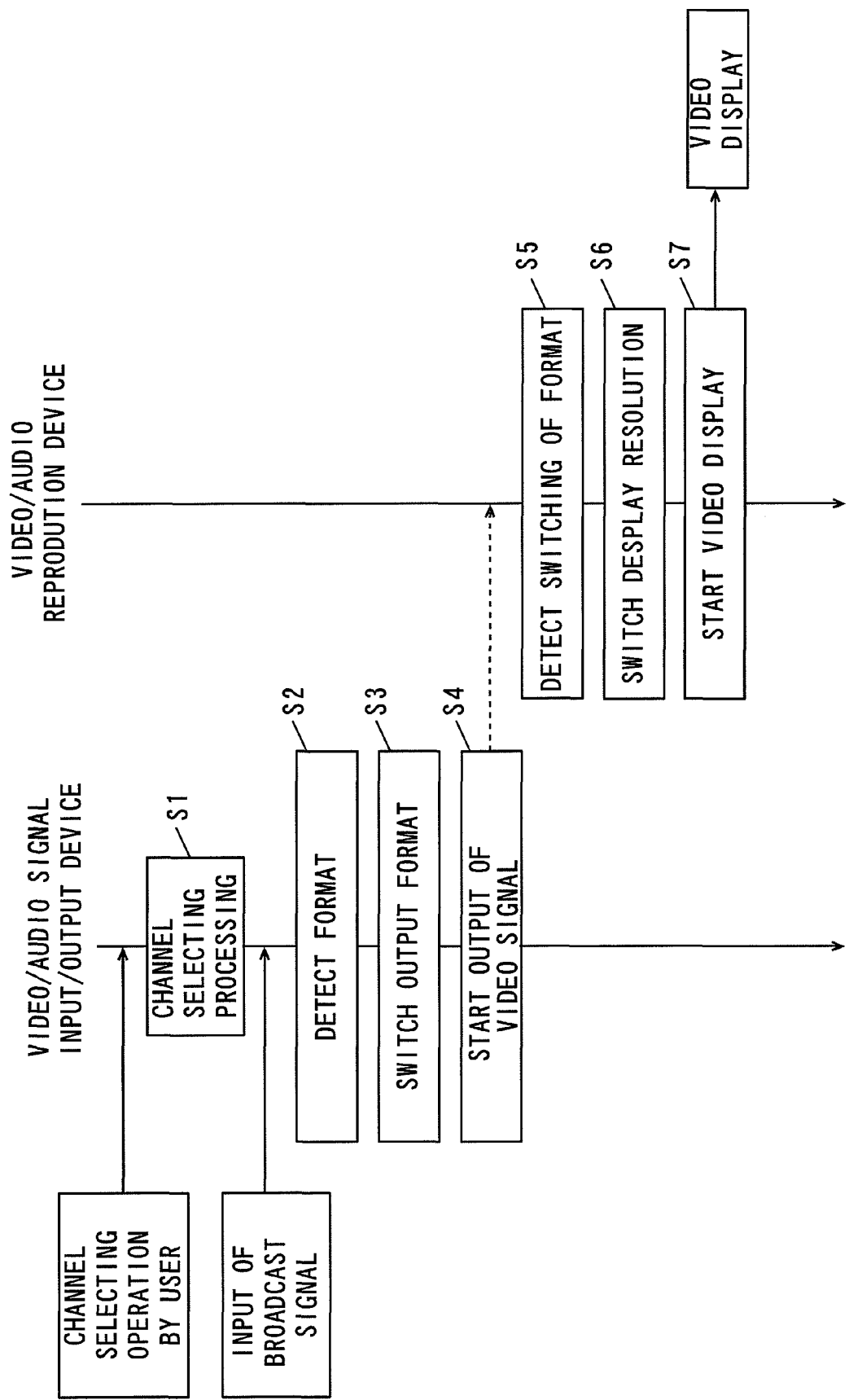

VIDEO DISPLAY BASED ON VIDEO SIGNAL AND AUDIO OUTPUT BASED ON AUDIO SIGNAL, VIDEO/AUDIO DEVICE NETWORK INCLUDING VIDEO/AUDIO SIGNAL INPUT/OUTPUT DEVICE AND VIDEO/AUDIO REPRODUCTION DEVICE, AND SIGNAL REPRODUCING METHOD

TECHNICAL FIELD

The present invention relates to a video/audio signal input/output device that performs input/output of a video signal and an audio signal, a video/audio reproduction device that performs video display based on the video signal and audio output based on the audio signal, a video/audio device network including the video/audio signal input/output device and the video/audio reproduction device that are connected to each other, and a signal reproducing method.

BACKGROUND ART

With recent progress of digitization of video signals, video/audio devices have employed a plurality of video and audio formats, resulting in an increase of video/audio devices compatible with the plurality of video and audio formats. Examples of the video/audio devices include a video/audio reproduction device (hereinafter abbreviated as a reproduction device) such as a television receiver or a projector, a video/audio signal input/output device (hereinafter abbreviated as an input/output device) such as a set-top box for receiving a digital broadcast or a DVD (Digital Versatile Disk) recorder, and so on. In addition, new video and audio formats have continuously been proposed. Therefore, it is considered that the video and audio formats with which the video/audio devices are compatible will further increase.

Hereinafter, one or both of the video format and the audio format is simply referred to as a "format".

The currently-used video formats include 480i, 480p, 576i, 576p, 720p and 1080i and so on, for example. Here, "i" represents an interlace, and "p" represents a progressive. The audio formats include AAC (Advanced Audio Coding), PCM (Pulse Code Modulation), AC3 (Audio Code number 3), Mpeg (Moving Picture Experts Group) and so on. However, all the video/audio devices are not compatible with all the formats.

Therefore, a device setting operation including the steps of comparing the format that can be output from the input/output device and the format that can be received and reproduced by the reproduction device, and setting the format to be used is performed when the input/output device is connected to the reproduction device and the video signal and the audio signal are transmitted from the input/output device to the reproduction device.

The device setting operation has a case where the usable format is determined by a user operation using a device setting menu and so on, and a case where the input/output device and the reproduction device automatically exchange respective information indicating the formats for transmission/reception to determine the usable format between the input/output device and the reproduction device.

When the plurality of formats are set as the usable formats as a result of the device setting operation, the format output from the input/output device is switched in some cases by a channel selecting operation, switching of a reproducing content or the like in the input/output device.

This occurs in a case described below, for example. 480i and 1080i are set as the usable video formats in the input/output device and the reproduction device. Moreover, video of one broadcast channel of television broadcasting is broadcasted in the video format of 480i. When a different broadcast channel is selected in such a state, the selected broadcast channel is broadcasted in the video format of 1080i. In this case, the video format of 480i output from the input/output device is switched to the video format of 1080i.

In transmission/reception of the signal between the conventional input/output device and reproduction device, however, it generally takes one to several seconds, which is long, from the channel selecting operation by a viewer to channel selecting processing and the switching of the format in the input/output device and then to display of the video in the reproduction device, when such switching of the format occurs.

FIG. 9 is a flowchart showing an operation of switching the format in the conventional video/audio signal input/output device and video/audio reproduction device.

In the case of broadcast reception, for example, when the viewer performs the channel selecting operation using a remote controller or the like, the input/output device firstly performs the channel selecting processing of the broadcast channel (Step S1). After inputting the broadcast signal, the input/output device detects the format of the video signal (Step S2), and switches the output format of the video signal (Step S3). After that, the input/output device starts the output of the video signal (Step S4).

The reproduction device receives the video signal from the input/output device and detects the switching of the format of the video signal (Step S5), and switches display resolution and adjusts a display position for displaying the video in the switched format (Step S6). Then, the reproduction device starts the video display (Step S7). As described above, a series of processing is performed by the plurality of devices. Therefore, it takes a long period of time from the channel selecting operation to the video display.

The above-described switching processing of the format may occur at all times not only when the channel selecting operation is performed but also when the format of the content to be reproduced is switched; for example, when reproduction of a medium such as a DVD that can be reproduced by the input/output device is started or when a content recorded in an HDD (Hard Disk Drive) is reproduced.

Therefore, the viewer must wait until the switching processing of the format of each of the input/output device and the reproduction device is completed every time the channel selecting operation and the switching of a view medium are performed, thereby preventing the smooth channel selecting operation and so on.

Patent Document 1 describes an image display device that performs format switching processing. In the image display device of Patent Document 1, display-related information included in a received digital signal is extracted, and the display mode is automatically set in response to the display-related information while the display mode is set according to a setting instruction by a user when the setting instruction of the display mode is provided by the user.

[Patent Document 1] JP 2006-108750 A

DISCLOSURE OF THE INVENTION

Problems to be Solved by the Invention

As described above, when two or more video/audio devices, such as the input/output device and the reproduction device, compatible with the plurality of video and audio formats are connected to one another to cause a video/audio content to be viewed, the plurality of video/audio devices need to switch their formats in selecting a channel or switching a content, which causes the switching of the format to occur. Therefore, it takes a long period of time to switch the format, which is not acceptable for viewers.

An object of the present invention is to provide a video/audio device network capable of reducing a period of time required for switching a format between a video/audio signal input/output device and a video/audio reproduction device.

Another object of the present invention is to provide a video/audio signal input/output device capable of reducing a period of time required for switching a format in a video/audio reproduction device when switching of a format of a signal occurs in a state of connection to the video/audio reproduction device.

Still another object of the present invention is to provide a video/audio reproduction device capable of reducing a period of time required for switching a format of a signal in a state of connection to a video/audio signal input/output device.

Yet another object of the present invention is to provide a signal reproducing method capable of reducing a period of time required for switching a format between a video/audio signal input/output device and a video/audio reproduction device.

Means for Solving the Problems (1) According to an aspect of the present invention, a video/audio device network includes a video/audio signal input/output device and a video/audio reproduction device, wherein the video/audio signal input/output device includes a receiver that receives a signal including at least one of a video signal and an audio signal, a demodulator that demodulates the signal received by the receiver, a converter that coverts the signal demodulated by the demodulator into an indicated format, a determiner that determines a format of the signal to be transmitted to the video/audio reproduction device when a format of the signal received by the receiver is changed, a first communicator that transmits information of the format determined by the determiner and the signal converted by the converter to the video/audio reproduction device, and a controller that controls the first communicator to transmit the information of the format determined by the determiner to the video/audio reproduction device in response to determination of the format by the determiner, and controls the first communicator to provide the format determined by the determiner to the converter and to transmit the signal converted by the converter to the video/audio reproduction device, and the video/audio reproduction device includes a second communicator that receives the information of the format transmitted from the video/audio signal input/output device and subsequently receives the signal transmitted from the video/audio signal input/output device, a setter that sets a reproducing condition of the signal based on the information of the format received by the second communicator, and a reproducer that reproduces in the reproducing condition set by the setter the signal received by the second communicator.

In the video/audio signal input/output device of the video/audio device network, the signal including at least one of the video signal and the audio signal is received by the receiver, the received signal is demodulated by the demodulator, and the demodulated signal is converted into the indicated format by the converter. In addition, when the format of the signal to be received is changed, the format of the signal to be transmitted to the video/audio reproduction device is determined by the determiner. In response to the determination of the format, the first communicator is controlled by the controller to transmit the information of the determined format to the video/audio reproduction device while the first communicator is controlled to provide the determined format to the converter and to transmit the converted signal to the video/audio reproduction device.

In the video/audio reproduction device, the information of the format transmitted form the video/audio signal input/output device is received by the second communicator. The reproducing condition of the signal is set by the setter based on the received information of the format. After that, the signal transmitted from the video/audio signal input/output device is received by the second communicator. The received signal is reproduced in the set reproducing condition by the reproducer.

As described above, the information of the format is transmitted to the video/audio reproduction device at the time of determination of the format of the signal to be transmitted from the video/audio signal input/output device, and the setting of the reproducing condition is started based on the information of the format in the video/audio reproduction device. Accordingly, the signal can immediately be reproduced in the video/audio reproduction device at the time of reception of the signal transmitted from the video/audio signal input/output device.

This reduces a period of time required for switching the format between the video/audio signal input/output device and the video/audio reproduction device.

(2) The determiner may determine the format of the signal to be transmitted to the video/audio reproduction device based on the format, which has been changed, of the signal received by the receiver and the format that can be reproduced by the video/audio reproduction device.

In this case, the signal transmitted from the video/audio signal input/output device can reliably be reproduced in the video/audio reproduction device.

(3) The video/audio signal input/output device may further include a storage that stores in advance a relationship between a supply source of the signal including at least one of a video signal and an audio signal and the format, the controller may retrieve, at the time of switching operation of the supplying source by a user, from the storage the format corresponding to the supply source after the switching as a predicted format and control the first communicator to transmit information of the predicted format to the video/audio reproduction device, the second communicator of the video/audio reproduction device may receive the information of the predicted format transmitted from the video/audio signal input/output device, and the setter may set the reproducing condition of the signal based on the information of the predicted format received by the second communicator, and subsequently set the reproducing condition of the signal again based on the information of the format when the information of the format received by the second communicator is different from the information of the predicted format.

In this case, the format corresponding to the supply source after the switching is retrieved at the time of the switching operation of the supplying source by the user from the storage by the controller as the predicted format in the video/audio signal input/output device. Then, the first communicator is controlled by the controller to transmit the information of the predicted format to the video/audio reproduction device.

On the other hand, the information of the predicted format transmitted from the video/audio signal input/output device is received by the second communicator in the video/audio reproduction device. Then, the reproducing condition of the signal is set by the setter based on the information of the received predicted format. After that, the reproducing condition of the signal is again set by the setter based on the information of the format when the received information of the format is different from the information of the predicted format.

Accordingly, the setting of the reproducing condition is started based on the information of the predicted format in the video/audio reproduction device at the time of reception of the information of the predicted format transmitted from the video/audio signal input/output device. In the video/audio reproduction device, the signal can immediately be reproduced at the time of reception of the signal transmitted from the video/audio signal input/output device.

This further reduces the period of time required for switching the format between the video/audio signal input/output device and the video/audio reproduction device.

(4) The setter may set the reproducing condition of the signal based on the information of the predicted format received by the second communicator, and subsequently maintain the reproducing condition set based on the information of the predicted format when the information of the format received by the second communicator is the same as the information of the predicted format.

In this case, the reproducing condition set based on the information of the predicted format is maintained when the received information of the format is the same as the information of the predicted format. Thus, the signal can immediately be reproduced in the video/audio reproduction device at the time of reception of the signal transmitted from the video/audio signal input/output device.

This further reduces the period of time required for switching the format between the video/audio signal input/output device and the video/audio reproduction device.

(5) Each of the first communicator and the second communicator may conform to an HDMI (High-Definition Multimedia Interface) standard, the first communicator may include a signal transmitter that transmits the signal converted by the converter to the video/audio reproduction device and an information transmitter that transmits the information of the format determined by the determiner to the video/audio reproduction device, the second communicator may include a signal receiver that receives the signal transmitted from the video/audio signal input/output device and an information receiver that receives the information of the format transmitted from the video/audio signal input/output device, and the information transmitter and the information receiver may be connected to each other by a CEC (Consumer Electronics Control) line.

In this case, the signal including at least one of the video signal and the audio signal and the information of the format can easily be transmitted from the video/audio signal input/output device to the video/audio reproduction device.

(6) According to another aspect of the present invention, a video/audio signal input/output device connected to a video/audio reproduction device includes a receiver that receives a signal including at least one of a video signal and an audio signal, a demodulator that demodulates the signal received by the receiver, a converter that coverts the signal demodulated by the demodulator into an indicated format, a determiner that determines a format of the signal to be transmitted to the video/audio reproduction device when the format of the signal received by the receiver is changed, a communicator that transmits information of the format determined by the determiner and the signal converted by the converter to the video/audio reproduction device, and a controller that controls the communicator to transmit the information of the format determined by the determiner to the video/audio reproduction device in response to determination of the format by the determiner, and controls the communicator to provide the format determined by the determiner to the converter and to transmit the signal converted by the converter to the video/audio reproduction device.

In the video/audio signal input/output device, the signal including at least one of the video signal and the audio signal is received by the receiver, the received signal is demodulated by the demodulator, and the demodulated signal is converted into the indicated format by the converter. In addition, when the format of the received signal is changed, the format of the signal to be transmitted to the video/audio reproduction device is determined by the determiner. In response to determination of the format, the communicator is controlled by the controller to transmit the information of the determined format to the video/audio reproduction device while the communicator is controlled to provide the determined format to the converter and to transmit the converted signal to the video/audio reproduction device.

As described above, the information of the format is transmitted to the video/audio reproduction device at the time of determination of the format of the signal to be transmitted from the video/audio signal input/output device, and the setting of the reproducing condition is started based on the information of the format in the video/audio reproduction device. Accordingly, the signal can immediately be reproduced in the video/audio reproduction device at the time of reception of the signal transmitted from the video/audio signal input/output device.

This reduces a period of time required for switching the format in the video/audio reproduction device when switching of the format of the signal occurs in a state where the video/audio signal input/output device is connected to the video/audio reproduction device.

(7) According to still another aspect of the present invention, a video/audio reproduction device connected to a video/audio signal input/output device that transmits information of a format of a signal including at least one of a video signal and an audio signal and subsequently transmits the signal includes a communicator that receives the information of the format transmitted from the video/audio signal input/output device and subsequently receives the signal transmitted from the video/audio signal input/output device, a setter that sets a reproducing condition of the signal based on the information of the format received by the communicator, and a reproducer that reproduces the signal received by the communicator in the reproducing condition set by the setter.

In the video/audio reproduction device, the information of the format transmitted from the video/audio signal input/output device is received by the communicator. The reproducing condition of the signal is set by the setter based on the received information of the format. After that, the signal transmitted from the video/audio signal input/output device is received by the communicator. The received signal is reproduced in the set reproducing condition by the reproducer.

As described above, the setting of the reproducing condition is started based on the information of the format in the video/audio reproduction device at the time of reception of the information of the format transmitted from the video/audio signal input/output device. Accordingly, in the video/audio reproduction device, the signal can immediately be reproduced at the time of reception of the signal transmitted from the video/audio signal input/output device.

This reduces a period of time required for switching the format of the signal in a state where the video/audio reproduction device is connected to the video/audio signal input/output device.

(8) According to yet another aspect of the present invention, a signal reproducing method for reproducing in a video/audio reproduction device a signal including at least one of a video signal and an audio signal transmitted from a video/audio signal input/output device includes the steps of, in the video/audio signal input/output device, receiving the signal including at least one of the video signal and the audio signal, in the video/audio signal input/output device, demodulating the signal that has been received, in the video/audio signal input/output device, converting the signal that has been demodulated into an indicated format, in the video/audio signal input/output device, determining a format of the signal to be transmitted to the video/audio reproduction device when the format of the signal to be received is changed, in the video/audio signal input/output device, transmitting information of the format that has been determined to the video/audio reproduction device in response to determination of the format, in the video/audio signal input/output device, transmitting the signal that has been converted to the video/audio reproduction device, in the video/audio reproduction device, receiving the information of the format transmitted from the video/audio signal input/output device, in the video/audio reproduction device, setting a reproducing condition of the signal based on the information of the format that has been received, in the video/audio reproduction device, receiving the signal transmitted from the video/audio signal input/output device, and in the video/audio reproduction device, reproducing in the reproducing condition that has been set the signal that has been received.

According to the signal reproducing method, the signal including at least one of the video signal and the audio signal is received, the received signal is demodulated, and the demodulated signal is converted into the indicated format in the video/audio signal input/output device. In addition, when the format of the signal to be received is changed, the format of the signal to be transmitted to the video/audio reproduction device is determined. In response to determination of the format, the information of the determined format is transmitted to the video/audio reproduction device, and the converted signal is transmitted to the video/audio reproduction device.

In the video/audio reproduction device, the information of the format transmitted from the video/audio signal input/output device is received. The reproducing condition of the signal is set based on the information of the received format. After that, the signal transmitted from the video/audio signal input/output device is received. The received signal is reproduced in the set reproducing condition.

As described above, the information of the format is transmitted to the video/audio reproduction device at the time of determination of the format of the signal to be transmitted from the video/audio signal input/output device, and the setting of the reproducing condition is started based on the information of the format in the video/audio reproduction device. Accordingly, the signal can immediately be reproduced in the video/audio reproduction device at the time of reception of the signal transmitted from the video/audio signal input/output device.

This reduces a period of time required for switching the format between the video/audio signal input/output device and the video/audio reproduction device.

EFFECTS OF THE INVENTION

According to the present invention, a period of time required for switching a format between a video/audio signal input/output device and a video/audio reproduction device can be reduced.

BRIEF DESCRIPTION OF THE DRAWINGS

FIG. 3 is a diagram showing in a simplified manner format information held by the reproduction device according to the first embodiment.

FIG. 4 is a schematic view showing an example of the format information transmitted from the input/output device to the reproduction device.

FIG. 7 is a schematic view showing an example of a format information list stored in an output format storage.

FIG. 8 is a flowchart showing procedures of the input/output device and the reproduction device in a video/audio device network according to a second embodiment.

FIG. 9 is a flowchart showing an operation of switching a format in conventional video/audio signal input/output device and video/audio reproduction device.

BEST MODE FOR CARRYING OUT THE INVENTION

Description will now be made of a video/audio signal input/output device, a video/audio reproduction device, a video/audio device network using the same and a signal reproducing method according to embodiments of the present invention.

(1) First Embodiment

Figure 1:
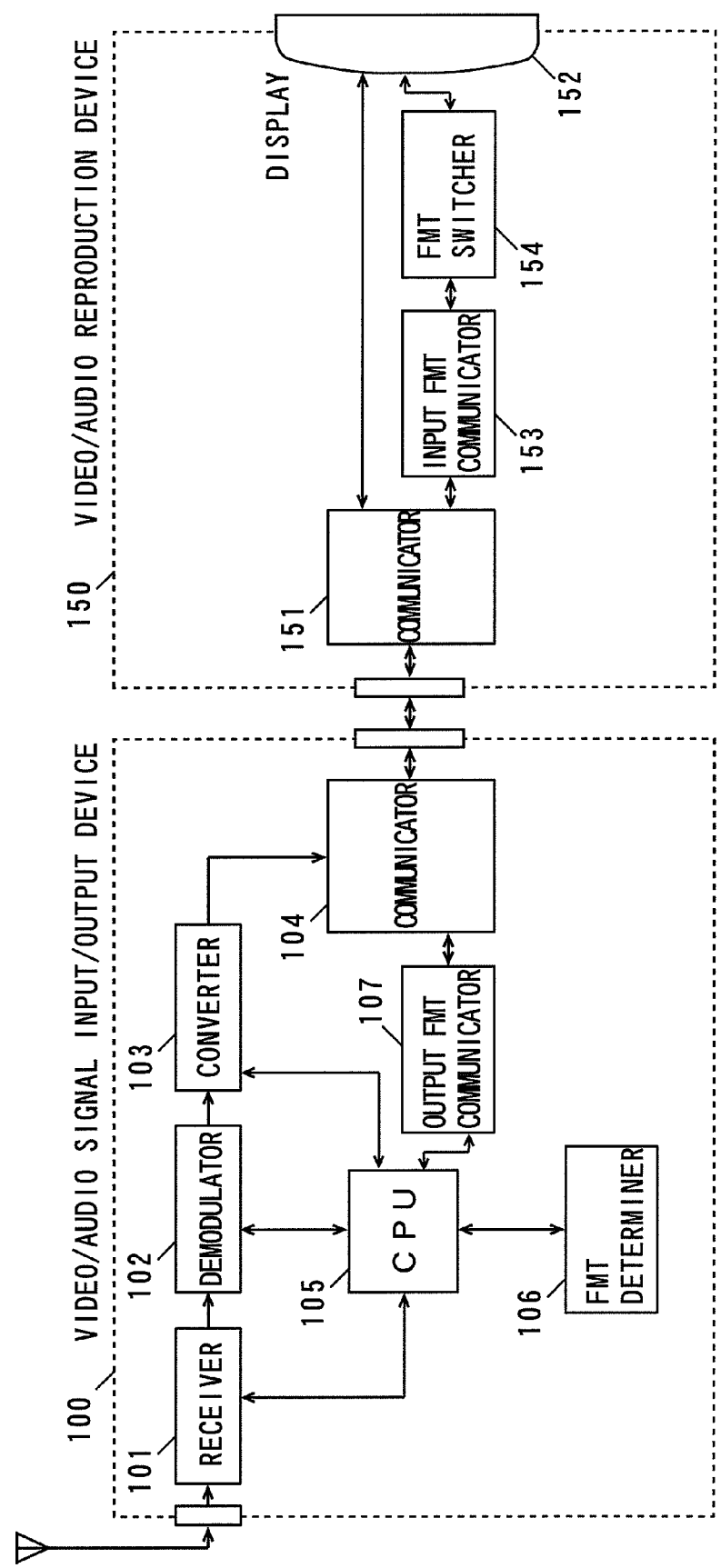
FIG. 1 is a block diagram showing the configurations of a video/audio signal input/output device and a video/audio reproduction device according to a first embodiment of the present invention.

FIG. 1 is a block diagram showing the configurations of a video/audio signal input/output device and a video/audio reproduction device according to a first embodiment of the present invention. Hereinafter, the video/audio signal input/output device 100 is abbreviated as the input/output device 100, and the video/audio reproduction device 150 is abbreviated as the reproduction device 150.

Note that one input/output device 100 and one reproduction device 150 are connected to each other in the present embodiment. Here, a state where two or more video/audio devices are connected to one another is referred to as a video/audio device network. Moreover, either or both of a video format and an audio format are simply referred to as a format.

The input/output device 100 includes a receiver 101, a demodulator 102, a converter 103, a communicator 104, a CPU (Central Processing Unit) 105, a format determiner (shown as a FMT determiner in FIG. 1) 106 and an output format communicator (shown as an output FMT communicator in FIG. 1) 107.

Airwaves are received by an antenna, and a broadcast signal is input to the receiver 101. The receiver 101 acquires from the input broadcast signal a frequency signal of a broadcast channel (hereinafter abbreviated as a channel) specified by the CPU 105.

The demodulator 102 acquires a video signal, an audio signal, program-related information and so on from the frequency signal output from the receiver 101, and demodulates the video signal, the audio signal, the program-related information and so on into a digital video signal, a digital audio signal, digital information and so on, respectively.

The converter 103 converts formats of the digital video signal and audio signal demodulated by the demodulator 102 into arbitrary formats. For example, when the video signal demodulated by the demodulator 102 has a format of 1080i, the converter 103 converts the format of the video signal into a format of 480i. Moreover, when the audio signal demodulated by the demodulator 102 has a format of AC3, the converter 103 converts the format of the audio signal into a format of PCM, for example.

The communicator 104 converts and transmits/receives the signal when communicating with an external device. This communicator 104 performs communication of the video signal, the audio signal and a data signal with the external device to which the communicator 104 is connected through an external terminal.

The CPU 105 is a microcomputer that manages a whole system of the input/output device 100, and controls an operation of each part and transmission/reception of messages.

The format determiner 106 extracts format information indicating a format required for reproducing video and audio from the program-related information demodulated by the demodulator 102. The format information includes screen resolution, a clock frequency and so on. The video format is, for example, 480i/60 Hz (720×480 pixels, an interlace and 60 Hz) or the like. The audio format is, for example, AC3, PCM and so on.

In addition, the format determiner 106 can acquire through the communicator 104 information related to the format that can be reproduced by the reproduction device 150. The format determiner 106 compares the acquired information related to the format that can be reproduced and the format of the video signal or the audio signal to be reproduced, and determines the format of the video signal or the audio signal to be actually output as an output format while switching the output format of the converter 103. Accordingly, the format of the video signal or the audio signal output from the input/output device 100 to the reproduction device 150 to be connected is determined.

The output format communicator 107 is capable of communicating with the reproduction device 150 through the communicator 104. In particular, the output format communicator 107 receives the output format determined by the format determiner 106 from the format determiner 106, and transmits format information indicating the output format to the reproduction device 150. Moreover, the output format communicator 107 can receive a signal such as a completion notice for switching, described later, from the reproduction device 150 to be connected.

As described above, the frequency signal of the channel selected by a channel selecting operation is extracted by the receiver 101, and the extracted frequency signal is demodulated into the digital video signal and the digital audio signal by the demodulator 102 in the input/output device 100. Furthermore, the video signal and audio signal are converted into a predetermined output format by the converter 103, and the video signal and audio signal having the converted output format are output to the reproduction device 150 through the communicator 104.

The reproduction device 150 includes a communicator 151, a display 152, an input format communicator (shown as an input FMT communicator in FIG. 1) 153, and a format switcher (shown as an FMT switcher in FIG. 1) 154.

The communicator 151 transmits/receives the video signal and the audio signal to/from an external device. The display 152 reproduces the video signal and the audio signal received by the communicator 151 as video and audio.

The input format communicator 153 performs communication of the format information and a command with the input/output device 100 through the communicator 151.

The format switcher 154 switches reproduction setting of the display 152 based on the format information acquired by the input format communicator 153. Here, the reproduction setting includes setting of video display and setting of audio output.

Figure 2:
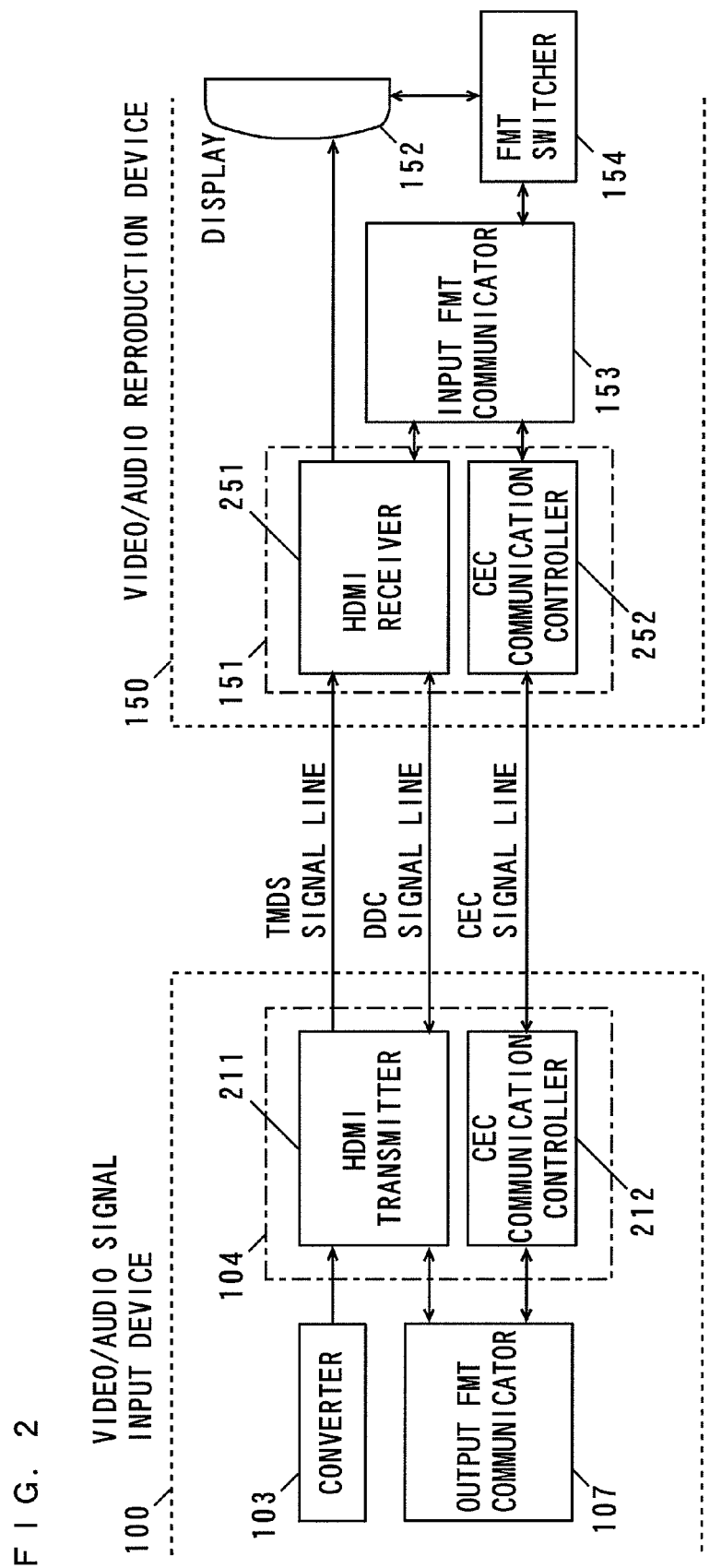
FIG. 2 is a block diagram specifically showing a method of connecting the input/output device and the reproduction device according to the first embodiment.

FIG. 2 is a block diagram specifically showing a method of connecting the input/output device and the reproduction device according to the first embodiment. Hereinafter, description is made of a connecting method conforming to the HDMI (High-Definition Multimedia Interface) standard as an example of the connecting method.

The HDMI standard was developed in December 2002. This HDMI standard allows auxiliary information as well as digital data to be input/output.

In the example of FIG. 2, the communicator 104 of the input/output device 100 is composed of an HDMI transmission unit. In this case, the communicator 104 is constituted by an HDMI transmitter 211 and a CEC (Consumer Electronics Control) communication controller 212.

The communicator 151 of the reproduction device 150 is composed of an HDMI reception unit. In this case, the communicator 151 is constituted by an HDMI receiver 251 and a CEC communication controller 252.

The communicator 104 includes a TMDS signal line conforming to the TMDS (Transition Minimized Differential Signaling) standard for outputting the video signal and audio signal, a DDC (Display Data Channel) signal line for transmitting/receiving setting information and status information, and a CEC (Consumer Electronics Control) signal line for connection to the external device. In this example, the communicator 104 of the input/output device 100 and the communicator 151 of the reproduction device 150 are connected to each other by the TMDS signal line, the DDC signal line and the CEC signal line. Hereinafter, the video signal and the audio signal are collectively referred to as the video/audio signal.

First, description is made of flow of the video/audio signal through the TMDS signal line.

The HDMI transmitter 211 of the communicator 104 of the input/output device 100 receives the video/audio signal output from the converter 103, and outputs the received video/audio signal to the TMDS signal line. The format of the video/audio signal output at this time is indicated by the CPU 105.

The video/audio signal output to the TMDS signal line is received by the HDMI receiver 251 of the communicator 151 of the reproduction device 150, and reproduced by the display 152 as the video and audio.

Next, the DDC signal line is used for transmitting/receiving the setting information and the status information. EDID (Extended Display Identification Data) information is one example of the information transmitted through the DDC signal line.

The EDID information means data held inside the video/audio reproduction device such as a television receiver, a display or the like, and defines the format that can be reproduced by the video/audio reproduction device holding the EDID information.

A video format that can be displayed on the screen and input by the reproduction device 150 is described using "Detailed timing data descriptor" and "Short video descriptor" in the EDID information.

FIG. 3 is a diagram showing in a simplified manner the format information held by the reproduction device according to the first embodiment. The format information of this example is information related to the video format. The reproduction device 150 may hold information related to the audio format.

As shown in FIG. 3, the EDID information includes the number of pixels in a horizontal direction of the screen, the number of pixels in a vertical direction of the screen, a scanning system (a progressive or the interlace), a horizontal frequency and an aspect ratio of the screen.

The EDID information of FIG. 3 includes 480i, 480p and 1080i. This EDID information indicates that the reproduction device 150 of the present embodiment is capable of receiving and reproducing the video format of 480i, 480p and 1080i. Similarly, audio format information is described in a format defined in the EIA/CEA-861B standard.

Next, description is made of procedures of the input/output device 100 and the reproduction device 150 when there occurs switching of the format due to channel selecting processing of the input/output device 100 according to a channel selecting operation by a user.

FIG. 4 is a schematic diagram showing an example of the format information transmitted from the input/output device to the reproduction device.

The format information of FIG. 4 includes the number of the pixels in the horizontal direction, the number of the pixels in the vertical direction, the scanning system (the progressive or the interlace), the horizontal frequency and the aspect ratio of the screen. In this example, a notice that the video signal is output from the input/output device 100 in the video format of 720×480 pixels, the interlace, 60 Hz and 4:3 is provided to the reproduction device 150.

While the format information includes the video format in the example of FIG. 4, the format information may similarly include the audio format.

In the present embodiment, the format information is transmitted from the input/output device 100 to the reproduction device 150 through the HDMI-connected CEC signal line. In the case, the format information of FIG. 4 can be communicated using a "Vendor Unique" command in the CEC standard stipulated relating to CEC communication in the HDMI standard.

Figure 5:
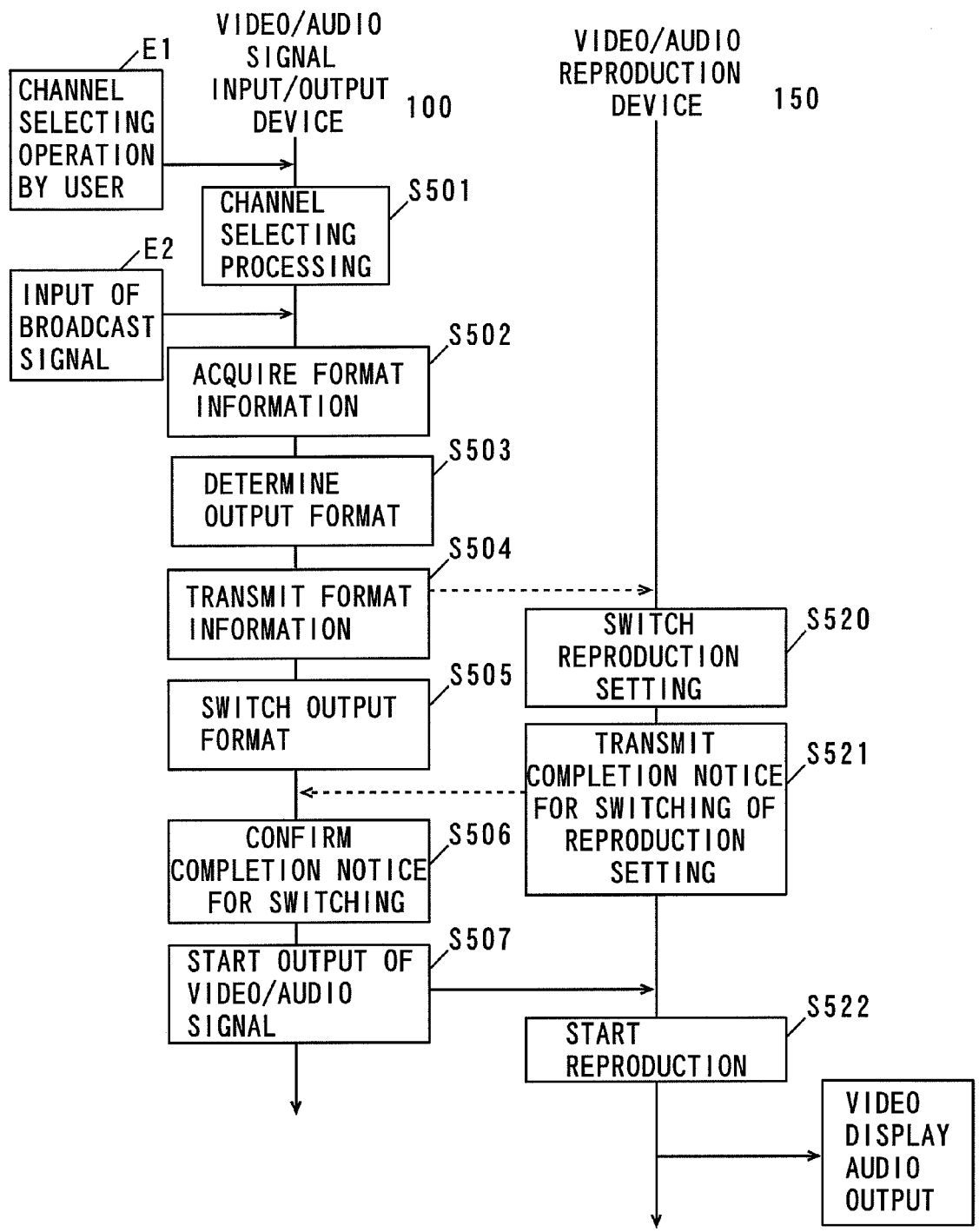
FIG. 5 is a flowchart showing procedures of the input/output device and the reproduction device in a video/audio device network according to the first embodiment.

FIG. 5 is a flowchart showing the procedures of the input/output device and the reproduction device in the video/audio device network according to the first embodiment.

FIG. 5 shows the procedures, when there occurs the switching of the format due to the channel selecting operation, from determination of the format to be output from the communicator 104 of the input/output device 100 to the transmission of the format information to the reproduction device 150 and the subsequent output of the video/audio signal, and then to the video display and audio output by the reproduction device 150.

First, when the user instructs the input/output device 100 to perform the channel selecting processing by the channel selecting operation using a remote controller or a front panel (Event E1), the receiver 101 of the input/output device 100 performs the channel selecting processing (Step S501).

The broadcast signal is input to the receiver 101 (Event E2). When a desired channel is selected by the channel selecting processing, the frequency signal of the channel is extracted from the broadcast signal by the receiver 101, and the demodulator 102 starts acquiring the video/audio signal and other information from the extracted frequency signal. In this case, the demodulator 102 acquires the format information corresponding to the video/audio signal when acquiring the video/audio signal to be reproduced (Step S502).

The format determiner 106, based on the format information, identifies the format of the acquired video/audio signal, judges whether or not the identified format of the video/audio signal can be reproduced by the reproduction device 150 that is currently connected, and determines the format of the video/audio signal output from the input/output device 100 as the output format (Step S503).

In this case, the format determiner 106 instructs the converter 103 to output the video/audio signal without converting the format of the acquired video/audio signal when the format of the acquired video/audio signal can be reproduced by the reproduction device 150, and instructs the converter 103 to convert the format of the acquired video/audio signal to a format that can be reproduced by the reproduction device 150 when the format of the acquired video/audio signal cannot be reproduced by the reproduction device 150.

Note that the format determiner 106 may use the EDID information acquired from the reproduction device 150 or the setting information relating to the output format such as the user setting for the input/output device 100 as supplementary information when judging whether or not the format of the video/audio signal can be reproduced by the reproduction device 150.

Next, the output format communicator 107 transmits the format information indicating the output format determined by the format determiner 106 to the reproduction device 150 through the communicator 104 (Step S504).

After that, the CPU 105 of the input/output device 100 switches the format of the video/audio signal to be output from the communicator 104 to the output format indicated by the format information of FIG. 4 by switching the setting of the converter 103 (Step S505).

On the other hand, when the format information is transmitted from the input/output device 100 in Step S504, the input format communicator 153 of the reproduction device 150 receives the format information through the communicator 151. The format switcher 154 switches the reproduction setting such as the display resolution of the display 152 and a synchronizing frequency based on the format information (Step S520). In the present embodiment, the format switcher 154 causes the state of the display 152 to coincide with the format information shown in FIG. 4.

When the switching of the reproduction setting of the reproduction device 150 is completed, the input format communicator 153 transmits the completion notice for switching of reproduction setting indicating that the switching of the reproduction setting has been completed to the input/output device 100 through the communicator 151 (Step S521).

The CPU 105 of the input/output device 100 confirms completion of the switching of the output format in Step S505 and reception of the completion notice for switching of reproduction setting in Step S521 (Step S506).

After that, the communicator 104 starts the output of the video/audio signal (Step S507). In the present embodiment, the video/audio signal is output from the HDMI transmitter 211 of the communicator 104 of FIG. 2 to the HDMI-connected TMDS line.

When the communicator 151 of the reproduction device 150 receives the video/audio signal output from the input/output device 100, the display 152 starts reproduction of the video and audio (Step S522). This causes the video to be displayed on the display 152 and the audio to be output from the display 152.

As described above, the input/output device 100 transmits the format information indicating the output format to the reproduction device 150, and subsequently switches the output format, and then transmits the video/audio signal to the reproduction device 150 in the video/audio device network according to the present embodiment. On the other hand, the reproduction device 150 can switch the reproduction setting when receiving the format information from the input/output device 100, and then immediately reproduce the video and audio when receiving the video/audio signal from the input/output device 100.

This allows the reproduction device 150 to present the video and audio to the viewer after a short period of time from the occurrence of the switching of the format of the video/audio signal in the input/output device 100.

In particular, the format information can easily and quickly be transmitted from the input/output device 100 to the reproduction device 150 using the HDMI-connected CEC line in the video/audio device network according to the present embodiment.

In this manner, the video/audio device network with high user convenience can be established.

While description is made of a case where the switching of the video format and audio format of the video/audio signal occurs in the present embodiment, the format information includes only the video format when only the video format of the video signal is switched and the format switcher 154 switches only the display setting of the display 152. Moreover, the format information includes only the audio format and the format switcher 154 switches only the audio setting of the display 152 when only the audio format of the audio signal is switched.

In addition, while the output format communicator 107 performs communication of the format information with the reproduction device 150 every time the channel selecting processing is performed in Step S504 in the present embodiment, the output format communicator 107 may transmit the format information to the reproduction device 150 only when the format of the video/audio signal that has been acquired before the channel selecting processing is different from the format of the video/audio signal acquired after the channel selecting processing.

(2) Second Embodiment

Figure 6:
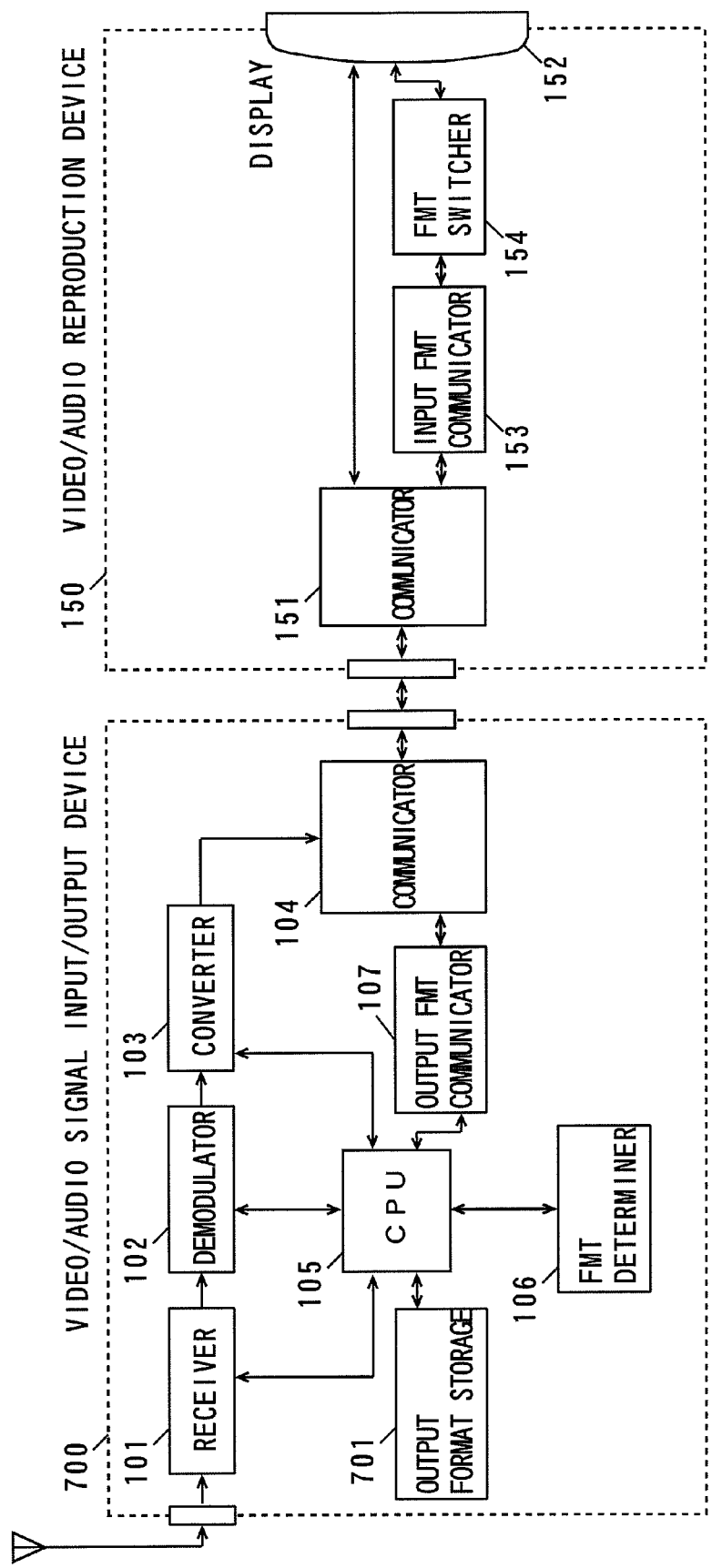
FIG. 6 is a block diagram showing the configurations of a video/audio signal input/output device and a video/audio reproduction device according to a second embodiment of the present invention.

FIG. 6 is a block diagram showing the configurations of a video/audio signal input/output device and a video/audio reproduction device according to a second embodiment of the present invention.

Also in this embodiment, the video/audio signal input/output device 700 is abbreviated as the input/output device 700, and the video/audio reproduction device 150 as the reproduction device 150.

The input/output device 700 of FIG. 6 is different from the input/output device 100 of FIG. 1 in that an output format storage (shown as an output FMT storage in FIG. 6) 701 is further provided. The output format storage 701 is connected to the CPU 105, and stores the output format for each channel as a format information list. More specifically, the output format storage 701 stores the video format of the video signal or the audio format of the audio signal that has previously been output in a channel and a medium in practice as the format information list for each of the channel and medium that can be selected by the input/output device 700. The output format can be switched at high speed by utilizing this output format storage 701.

Since the configuration and operation of other parts of the input/output device 700 is the same as the configuration and operation of the corresponding parts of the input/output device 100 of FIG. 1, the same portions as those of FIG. 1 are denoted by the same reference numerals in FIG. 6 and hence, the detailed description thereof is omitted.

FIG. 7 is a schematic view showing an example of the format information list stored in the output format storage 701.

In the example of FIG. 7, the format information list includes a list of selectable channels and the format information indicating the video format and the audio format for each channel. The video format is composed of the number of the pixels in the horizontal direction, the number of the pixels in the vertical direction, the scanning system (the progressive or the interlace), the horizontal frequency and the aspect ratio of the screen.

This format information list can be obtained by storing for each channel the format information of the video/audio signal output from the input/output device 700 in the previous channel selecting processing.

FIG. 8 is a flowchart showing the procedures of the input/output device and the reproduction device in the video/audio device network according to the second embodiment.

FIG. 8 shows the procedures, when there occurs the switching of the format due to the channel selecting operation, from prediction of the format of the video/audio signal obtained by the channel selecting processing and determination of the format to be output from the communicator 104 of the input/output device 700 and the subsequent transmission of the format information to the reproduction device 150 to the output of the video/audio signal and then to the video display and the audio output by the reproduction device 150.

First, when the user provides an instruction on the channel selecting processing to the input/output device 100 by the channel selecting operation using the remote controller or the front panel (Event E1), the CPU 105 retrieves the format information corresponding to the channel selected by the channel selecting operation from the format information list stored in the output format storage 701 as format prediction data (Step S801).

Next, the output format communicator 107 transmits the format prediction data to the reproduction device 150 through the communicator 104 (Step S802). In this case, the format prediction data transmitted by the output format communicator 107 has the same items as the format information of FIG. 5 in the first embodiment.

In FIG. 7, when the channel "004" is selected, for example, the format prediction data indicating the video format of 1920×1080 pixels, the interlace, 60 Hz and 16:9 is transmitted from the input/output device 100 to the reproduction device 150.

In this case, a parameter indicating that the format information is the format prediction data is simultaneously transmitted with the format information of the corresponding channel. For example, the parameter indicating the format prediction data is additionally written in the format information.

In the present embodiment, the format prediction data is transmitted through the HDMI-connected CEC signal line. In the case, the format prediction data can be transmitted using the "Vendor Unique" command in the CEC standard stipulated relating to the CEC communication in the HDMI standard.

When in Step S801 the format information corresponding to the selected channel ("004", for example) does not exist in the format information list stored in the output format storage 701, or the channel ("004", for example) is selected for the first time in the input/output device 700, the process of Step S802 will not be performed.

Meanwhile, when the format prediction data is transmitted from the input/output device 700 in Step S802, the input format communicator 153 of the reproduction device 150 receives the format prediction data through the communicator 151. The format switcher 154 performs preliminary switching of reproduction setting of the display 152 based on the format prediction data (Step S820). The preliminary switching of reproduction setting means to preliminarily switch the reproduction setting of the display 152 based on the format prediction data. Specifically, the screen of the display 152 is temporarily muted, and switching of the display resolution, change of the synchronizing frequency and so on are performed.

When the preliminary switching of reproduction setting is completed, the input format communicator 153 transmits a completion notice for preliminary switching of reproduction setting indicating that the preliminary switching of reproduction setting is completed to the input/output device 700 through the communicator 151 (Step S821).

On the other hand, the receiver 101 of the input/output device 700 performs the channel selecting processing after the process of Step S802 (Step S803).

The broadcast signal is input to the receiver 101 (Event E2). When the desired channel is selected by the channel selecting processing, the frequency signal of the channel is extracted from the broadcast signal by the receiver 101, and the demodulator 102 starts acquiring the video/audio signal and other information from the extracted frequency signal. In this case, the demodulator 102 acquires the format information corresponding to the video/audio signal in acquiring the video/audio signal to be reproduced (Step S804).

The format determiner 106 identifies the format of the acquired video/audio signal, judges whether or not the format of the identified video/audio signal can be reproduced by the currently connected reproduction device 150, and determines the format of the video/audio signal to be output from the input/output device 100 as the output format based on the format information (Step S805).

In this case, the format determiner 106 instructs the converter 103 to output the video/audio signal without converting the format of the acquired video/audio signal when the format of the acquired video/audio signal can be reproduced by the reproduction device 150, and instructs the converter 103 to convert the format of the acquired video/audio signal into the format that can be reproduced by the reproduction device 150 when the format of the acquired video/audio signal cannot be reproduced by the reproduction device 150.

Note that a method of determining the format by this format determiner 106 is the same as that in the first embodiment.

Next, the output format communicator 107 transmits the format information indicating the output format determined by the format determiner 106 to the reproduction device 150 (Step S806).

When the format information is transmitted from the input/output device 700, the input format communicator 153 of the reproduction device 150 receives the format information through the communicator 151. The format switcher 154 confirms whether or not the format prediction data transmitted from the input/output device 700 in Step S802 coincides with the format information transmitted from the input/output device 700 in Step SS806 (Step S822).

When the format prediction data does not coincide with the format information or when the format prediction data does not exist, the format switcher 154 performs the switching of reproduction setting of the display 152 based on the format information (Step S823).

When the format prediction data coincides with the format information, the format switcher 154 does not perform the process of Step S823.

When the confirmation in Step S822 and the switching of reproduction setting in Step S823 are completed, the input format communicator 153 transmits a completion notice for format confirmation to the input/output device 700 through the communicator 151 (Step S824).

On the other hand, after the output format communicator 107 transmits the format information to the reproduction device 150 in Step S806, the CPU 105 of the input/output device 700 switches the format of the video/audio signal to be output from the communicator 104 to the determined output format by switching the setting of the converter 103 (Step S807).

Next, the CPU 105 saves the format information transmitted to the reproduction device 150 in Step S806 to a storage region of the corresponding channel in the format information list stored in the output format storage 701 (Step S808).

Next, the CPU 105 confirms the completion notice for preliminary switching of reproduction setting in Step S821 and reception of the completion notice for format confirmation in Step S824 (Step S809).

After that, the communicator 104 starts the output of the video/audio signal (Step S810). In the present embodiment, the video/audio signal is output from the HDMI transmitter 211 of the communicator 151 of FIG. 2 to the HDMI-connected TMDS line.

When the communicator 151 of the reproduction device 150 receives the video/audio signal output from the input/output device 100, the display 152 starts the reproduction of the video and audio (Step S825). This causes the video to be displayed on the display 152 and the audio to be output from the display 152.

As described above, the input/output device 700 transmits the format information for each channel preliminarily stored before the channel selecting processing to the reproduction device 150 as the format prediction data and the reproduction device 150 preliminarily switches the reproduction setting based on the format prediction data in the video/audio device network according to the present embodiment. Then, the input/output device 700 switches the output format after transmitting the format information indicating the output format to the reproduction device 150, and subsequently transmits the video/audio signal to the reproduction device 150. On the other hand, the reproduction device 150 can immediately reproduce the video and audio in receiving the video/audio signal from the input/output device 100 when the received format information coincides with the format prediction data. Moreover, the reproduction device 150 can immediately reproduce the video and audio in receiving the video/audio signal from the input/output device 100 after switching the reproduction setting based on the format information when the received format information does not coincide with the format prediction data. In this manner, the reproduction device 150 can more quickly perform the switching of the reproduction setting.

This allows the reproduction device 150 to present the video and audio to the viewer after a short period of time from the occurrence of the switching of the format of the video/audio signal in the input/output device 700.

(3) Other Embodiments

While the airwaves are used for acquiring the video/audio signal by the input/output device in the first and second embodiments, the present invention is not limited to this. For example, the input/output device may acquire the video/audio signal recorded in a medium such as a DVD, or may acquire the video/audio signal using the Internet connection, wireless communication or the like.

While description is made of the video/audio device network using the HDMI connection and the method of determining the output format using the CEC line as one example in the first and second embodiments, the connection between the input/output device and the reproduction device in the present invention is not limited to the HDMI connection. For example, the input/output device and the reproduction device may be connected to each other through wire communication or wireless communication.

Furthermore, while description is made of an example in which the viewer performs the channel selecting operation in the first and second embodiments, the present invention is not limited to this. For example, the channel selecting operation may automatically be performed by the input/output device, or the channel selecting operation may be performed by communication from an external device connected to the input/output device or other methods.

Moreover, the present invention is applicable to a case where the format of the video/audio signal of one channel is switched on a time base during view of a program of the channel.

(4) Correspondences Between Elements in the Claims and Parts in Embodiments

In the following paragraphs, non-limiting examples of correspondences between various elements recited in the claims below and those described above with respect to various preferred embodiments of the present invention are explained.

In the above-described embodiments, the receiver 101 is an example of a receiver, the demodulator 102 is an example of a demodulator, the converter 103 is an example of a converter, the format determiner 106 is an example of a determiner, the communicator 104 and the output format communicator 107 are examples of a first communicator, and the CPU 105 is an example of a controller. The communicator 151 and the input format communicator 153 are examples of a second communicator, the format switcher 154 is an example of a setter, and the display 152 is an example of a reproducer.

The output format storage 701 is an example of a storage, the HDMI transmitter 211 is an example of a signal transmitter, the CEC communication controller 212 is an example of an information transmitter, the HDMI receiver 251 is an example of a signal receiver, and the CEC communication controller 252 is an example of an information receiver.

Industrial Applicability

The present invention can effectively be utilized for switching reproduction setting in a reproduction device in response to occurrence of switching of a format of a video signal or an audio signal in a video/audio signal input/output device, for example.

The invention claimed is

1. A video/audio device network, comprising:
   a video/audio signal input/output device; and
   a video/audio reproduction device,
   wherein said video/audio signal input/output device includes:
   an acquirer that acquires a signal including a video signal and an audio signal to be input,
   a converter that converts the signal acquired by said acquirer into an indicated format,
   a determiner that determines a format of the signal to be output to said video/audio reproduction device when a format of the signal acquired by said acquirer is changed,
   an outputter that outputs information of the format determined by said determiner and the signal converted by said converter to said video/audio reproduction device,
   a storage that stores in advance a relationship between a supply source of the signal including the video signal, the audio signal, and the format, and
   a controller that controls said outputter to output the information of the format determined by said determiner to said video/audio reproduction device in response to a determination of the format by said determiner, and subsequently controls said outputter to provide the format determined by said determiner to said converter, and to output the signal converted by said converter to said video/audio reproduction device,
   wherein said controller retrieves, at the time of switching operation of the supply source by a user, from said storage the format corresponding to the supply source after the switching as a predicted format, and controls said outputter to output information of the predicted format to said video/audio reproduction device, and
   said video/audio reproduction device includes:
   an inputter that inputs the information of the format output from said video/audio signal input/output device, and subsequently inputs the signal output from said video/audio signal input/output device,
   a reproducer that reproduces the signal input by said inputter as a video and an audio, and
   a setter that sets, based on said information of the format input by said inputter, said reproducer in a state where said reproducer can reproduce the signal of the format indicated by said information of the format,
   wherein said inputter inputs the information of the predicted format output from said video/audio signal input/output device, and
   said setter sets, based on said information of the predicted format input by said inputter, said reproducer in a state where said reproducer can reproduce the signal of the format indicated by said information of the predicted format, and subsequently resets, based on said information of the format, said reproducer in a state where said reproducer can reproduce the signal of the format indicated by said information of the format when said information of the format input by said inputter is different from said information of the predicted format.

2. The video/audio device network according to claim 1, wherein said determiner determines the format of the signal to be output to said video/audio reproduction device based on the format, which has been changed, of the signal acquired by said acquirer and the format that can be reproduced by said video/audio reproduction device.

3. The video/audio device network according to claim 1, wherein said setter sets, based on said information of the predicted format input by said inputter, said reproducer in a state where said reproducer can reproduce the signal of the format indicated by said information of the predicted format, and subsequently maintains, based on said information of the predicted format, said reproducer in a state where said reproducer can reproduce the signal of the format indicated by said information of the predicted format when said information of the format input by said inputter is the same as said information of the predicted format.

4. The video/audio device network according to claim 1, wherein each of said outputter and said inputter conforms to an HDMI (High-Definition Multimedia Interface) standard,
said first outputter includes:
a signal outputter that outputs the signal converted by said converter to said video/audio reproduction device, and
an information outputter that outputs the information of the format determined by said determiner to said video/audio reproduction device,
said inputter includes:
a signal inputter that inputs the signal output from said video/audio signal input/output device, and
an information inputter that inputs the information of the format output from said video/audio signal input/output device, and
said information outputter and said information inputter are connected to each other by a CEC (Consumer Electronics Control) line.

5. A signal reproducing method for reproducing in a video/audio reproduction device a signal including a video signal and an audio signal output from a video/audio signal input/output device, comprising:
in said video/audio signal input/output device, acquiring the signal including the video signal and the audio signal;
in said video/audio signal input/output device, converting said acquired signal into an indicated format;
in said video/audio signal input/output device, determining a format of the signal to be output to said video/audio reproduction device when the format of said signal to be acquired is changed;
in said video/audio signal input/output device, outputting information of said format that has been determined to said video/audio reproduction device in response to a determination of said format;
in said video/audio signal input/output device, outputting said signal that has been converted to said video/audio reproduction device;
in said video/audio signal input/output device, storing in advance a relationship between a supply source of the signal including the video signal, the audio signal, and the format;
in said video/audio signal input/output device, retrieving, at the time of switching operation of the supply source by a user, from said storage the format corresponding to the supply source after the switching as a predicted format, and outputting information of the predicted format to said video/audio reproduction device;
in said video/audio reproduction device, inputting the information of the format output from said video/audio signal input/output device;
in said video/audio reproduction device, inputting the signal output from said video/audio signal input/output device; and
in said video/audio reproduction device, reproducing said input signal as a video and an audio by a reproducer;
in said video/audio reproduction device, setting, based on said input information of the format, said reproducer in a state where said reproducer can reproduce the signal of the format indicated by said information of the format;
in said video/audio reproduction device, inputting the information of the predicted format output from said video/audio signal input/output device; and
in said video/audio reproduction device, setting, based on said input information of the predicted format, said reproducer in a state where said reproducer can reproduce the signal of the format indicated by said information of the predicted format, and subsequently resetting, based on said information of the format, said reproducer in a state where said reproducer can reproduce the signal of the format indicated by said information of the format when said input information of the format is different from said information of the predicted format.

* * * * *

UNITED STATES PATENT AND TRADEMARK OFFICE
CERTIFICATE OF CORRECTION

| | |
|---|---|
| PATENT NO. | : 8,325,278 B2 |
| APPLICATION NO. | : 12/439835 |
| DATED | : December 4, 2012 |
| INVENTOR(S) | : Hirotaka Oku |

It is certified that error appears in the above-identified patent and that said Letters Patent is hereby corrected as shown below:

On the Title Page, Item (54) and in the Specification, column 1 (the Title) "VIDEO DISPLAY BASED ON VIDEO SIGNAL AND AUDIO OUTPUT BASED ON AUDIO SIGNAL, VIDEO/AUDIO DEVICE NETWORK INCLUDING VIDEO/AUDIO SIGNAL INPUT/OUTPUT DEVICE AND VIDEO./AUDIO REPRODUCTION DEVICE, AND SIGNAL REPRODUCING METHOD" should read:

--VIDEO/AUDIO SIGNAL INPUT/OUTPUT DEVICE THAT PERFORMS INPUT/OUTPUT OF VIDEO SIGNAL AND AUDIO SIGNAL, VIDEO/AUDIO REPRODUCTION DEVICE THAT PERFORMS VIDEO DISPLAY BASED ON VIDEO SIGNAL AND AUDIO OUTPUT BASED ON AUDIO SIGNAL, VIDEO/AUDIO DEVICE NETWORK INCLUDING VIDEO/AUDIO SIGNAL INPUT/OUTPUT DEVICE AND VIDEO/AUDIO REPRODUCTION DEVICE, AND SIGNAL REPRODUCING METHOD--.

Signed and Sealed this
Sixteenth Day of July, 2013

Teresa Stanek Rea
*Acting Director of the United States Patent and Trademark Office*